United States Patent
Kanai

(10) Patent No.: US 8,166,356 B2
(45) Date of Patent: Apr. 24, 2012

(54) MEMORY SYSTEM AND MEMORY ACCESS METHOD

(75) Inventor: Tatsunori Kanai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 662 days.

(21) Appl. No.: 12/393,251

(22) Filed: Feb. 26, 2009

(65) Prior Publication Data

US 2009/0319867 A1     Dec. 24, 2009

(30) Foreign Application Priority Data

Jun. 24, 2008  (JP) ................................. 2008-164205

(51) Int. Cl.
*G06F 11/00* (2006.01)
(52) U.S. Cl. ........................................ 714/719; 714/819
(58) Field of Classification Search .................. 714/719, 714/819

See application file for complete search history.

(56) References Cited

U.S. PATENT DOCUMENTS

| | | | | |
|---|---|---|---|---|
| 4,926,424 A * | 5/1990 | Maeno | ............ | 714/719 |
| 7,240,253 B2 * | 7/2007 | Yoshida et al. | ............ | 714/718 |
| 7,302,622 B2 * | 11/2007 | Beer | ............ | 714/718 |
| 7,565,586 B2 * | 7/2009 | Thompson | ............ | 714/718 |
| 7,747,913 B2 * | 6/2010 | Abella et al. | ............ | 714/718 |
| RE42,120 E * | 2/2011 | Tanaka et al. | ............ | 365/185.22 |
| 2001/0052090 A1 * | 12/2001 | Mio | ............ | 714/42 |
| 2002/0040455 A1 * | 4/2002 | Nakamura | ............ | 714/719 |
| 2006/0002180 A1 * | 1/2006 | Frey | ............ | 365/158 |
| 2008/0155363 A1 * | 6/2008 | Kohara | ............ | 714/719 |
| 2009/0091968 A1 * | 4/2009 | Dietrich et al. | ............ | 365/148 |
| 2009/0319867 A1 * | 12/2009 | Kanai | ............ | 714/763 |

FOREIGN PATENT DOCUMENTS

JP     2004-031904     1/2004

* cited by examiner

*Primary Examiner* — Joshua Lohn

(74) *Attorney, Agent, or Firm* — Turocy & Watson, LLP

(57) ABSTRACT

A memory system has a redundancy coding circuit that performs redundancy coding process for write data, an inverter circuit which inverts values of individual bits of the data that has resulted from the redundancy coding process, a selector which selects the data that has resulted from the redundancy coding process or data that has been inverted by the inverter circuit based on a selecting signal, a memory which stores the selected data, a comparator which compares data read from the memory with the selected data and outputs a comparison result, a write control circuit which generates the selecting signal based on the comparison results, and a redundancy decoding circuit that performs a redundancy decoding process for data read from the memory to output the processed data.

20 Claims, 17 Drawing Sheets

$x_0 = 0$
$x_1 = 0 \oplus d_0$
$x_2 = 0 \oplus d_0 \oplus d_1$
$x_3 = 0 \oplus d_0 \oplus d_1 \oplus d_2$
$x_4 = 0 \oplus d_0 \oplus d_1 \oplus d_2 \oplus d_3$
$x_5 = 0 \oplus d_0 \oplus d_1 \oplus d_2 \oplus d_3 \oplus d_4$
$x_6 = 0 \oplus d_0 \oplus d_1 \oplus d_2 \oplus d_3 \oplus d_4 \oplus d_5$
$x_7 = 0 \oplus d_0 \oplus d_1 \oplus d_2 \oplus d_3 \oplus d_4 \oplus d_5 \oplus d_6$
$x_8 = 0 \oplus d_0 \oplus d_1 \oplus d_2 \oplus d_3 \oplus d_4 \oplus d_5 \oplus d_6 \oplus d_7$ $$d_0 = x_0 \oplus x_1$$
$$d_1 = x_1 \oplus x_2$$
$$d_2 = x_2 \oplus x_3$$
$$d_3 = x_3 \oplus x_4$$
$$d_4 = x_4 \oplus x_5$$
$$d_5 = x_5 \oplus x_6$$
$$d_6 = x_6 \oplus x_7$$
$$d_7 = x_7 \oplus x_8$$

$x_0 = 1 \oplus d_0$
$x_1 = 1 \oplus d_0 \oplus d_1$
$x_2 = 1 \oplus d_0 \oplus d_1 \oplus d_2$
$x_3 = 1 \oplus d_0 \oplus d_1 \oplus d_2 \oplus d_3$
$x_4 = 1 \oplus d_0 \oplus d_1 \oplus d_2 \oplus d_3 \oplus d_4$
$x_5 = 1 \oplus d_0 \oplus d_1 \oplus d_2 \oplus d_3 \oplus d_4 \oplus d_5$
$x_6 = 1 \oplus d_0 \oplus d_1 \oplus d_2 \oplus d_3 \oplus d_4 \oplus d_5 \oplus d_6$
$x_7 = 1 \oplus d_0 \oplus d_1 \oplus d_2 \oplus d_3 \oplus d_4 \oplus d_5 \oplus d_6$
$x_8 = 1 \oplus d_0 \oplus d_1 \oplus d_2 \oplus d_3 \oplus d_4 \oplus d_5 \oplus d_6 \oplus d_7$

FIG. 14

$$x_0 = 0 \oplus d_0 \oplus d_1 \oplus d_2 \oplus d_3$$
$$x_1 = 0 \oplus d_1 \oplus d_2 \oplus d_3$$
$$x_2 = 0 \oplus d_2 \oplus d_3$$
$$x_3 = 0 \oplus d_3$$
$$x_4 = 0 \oplus d_4$$
$$x_5 = 0 \oplus d_4 \oplus d_5$$
$$x_6 = 0 \oplus d_4 \oplus d_5 \oplus d_6$$
$$x_7 = 0 \oplus d_4 \oplus d_5 \oplus d_6 \oplus d_7$$
$$x_8 = 0$$

FIG. 16

$x_0 = 1 \oplus d_0$
$x_1 = 1 \oplus d_1 \oplus d_2 \oplus d_3$
$x_2 = 1 \oplus d_2 \oplus d_3$
$x_3 = 1 \oplus d_3$
$x_4 = 1 \oplus d_4$
$x_5 = 1 \oplus d_4 \oplus d_5$
$x_6 = 1 \oplus d_4 \oplus d_5 \oplus d_6$
$x_7 = 1 \oplus d_4 \oplus d_5 \oplus d_6 \oplus d_7$
$x_8 = 1$

FIG. 18

MEMORY SYSTEM AND MEMORY ACCESS METHOD

CROSS REFERENCE TO RELATED APPLICATION

This application is based upon and claims benefit of priority from the Japanese Patent Application No. 2008-164205, filed on Jun. 24, 2008, the entire contents of which are incorporated herein by reference.

BACKGROUND OF THE INVENTION

The present invention relates to a memory system and a memory access method.

A highly integrated memory chip may include bad memory cells which do not perform desired operation due to the variation in the processing accuracy of the individual memory cells (1-bit storage elements) when the memory cells are manufactured.

A measure that has been taken for the manufacturing variation, for example, is to fabricate memory cells in advance, exceeding the number of memory cells that correspond to actually required capacity and to permit the excessive memory cells to replace bad memory cells to thereby enhance yield. Also, a scheme has been used, in which bits in bad memory cells are remedied using error correcting codes (ECCs).

Further, a scheme has been suggested for a read only memory, such as an ROM or a PROM. Specifically, in this scheme, a memory component that stores a bit sequence and an additional memory component are provided to such a read only memory. When a bad memory cell that can only store either one of "0" and "1" dares to store a value that the bad memory cell in question cannot store, values of individual data bits in the bit sequence are inverted and stored, and the additional memory component is permitted to store a value that indicates the fact that the data have been inverted (see, for example, JP-A 2004-31904 (KOKAI)). In reading out the data, reference is made to the value in the additional memory component, and if there is an indication that the data have been inverted at the time of storage, the read data are inverted and used.

In an electrically rewritable memory, such as an MRAM or an ReRAM, which uses a memory cell that can possess two different resistance values, the memory cell is brought into either a high resistance state or a low resistance state, so that data can be stored by having one value been correlated to a logical value "0" and the other value been correlated to a logical value "1". When the data are read, it is determined whether each of the resistance values corresponds to the logical value "0" or "1" (or "1" or "0"), based on whether or not the resistance value of the memory cell is smaller or larger than a threshold.

If manufacturing variations are great in manufacturing such memories, a memory cell having the resistance values smaller than the threshold is likely to exist irrespective of the low or high resistance state of the memory cell, or contrarily, a memory cell having the resistance values larger than the threshold is likely to exist irrespective of the low or high resistance state of the memory cell. Such memory cells end up with always reading either "0" or "1", notwithstanding that "0" or "1" is written.

As a measure taken for the manufacturing variations of MRAMs, for example, a technique called "self-referencing reading" has been used. With this technique, data are first read from a memory cell. After that, "1" (or "0") is written into the same memory cell in order to determine the value that has been read is "0" or "1". Then, the memory cell is read again to compare the value that has been read this time with the firstly read value and determine whether the firstly read value is "0" or "1". Then, the resultant value is again written into the memory cell.

Use of the "self-referencing reading" may enable correct reading/writing between "0" and "1" even when the resistance values vary between memory cells. However, this technique requires two readings and two writings for each memory cell, raising a problem that long access time has to be taken.

SUMMARY OF THE INVENTION

According to one aspect of the present invention, there is provided a memory system comprising:

a redundancy coding circuit that performs redundancy coding process for write data;

an inverter circuit provided with data that has resulted from the redundancy coding process performed by the redundancy coding circuit to invert values of individual bits of the data that has resulted from the redundancy coding process;

a selector provided with the data that has resulted from the redundancy coding process and data that has been inverted by the inverter circuit to make a selection of either one of the data based on a selecting signal;

a memory that stores the data selected by the selector;

a comparator that compares data read from the memory with either one of the data that has resulted from the redundancy coding process and the data inverted by the inverter circuit to output a comparison result signal indicative of comparison results;

a write control circuit that controls writing of the memory, while being provided with the comparison result signal to produce and output the selecting signal based on the comparison results indicated by the comparison result signal; and a redundancy decoding circuit that performs a redundancy decoding process for data read from the memory to output the processed data.

According to one aspect of the present invention, there is provided a memory access method, comprising:

performing a redundancy coding process for write data;

writing either one of data resulting from the redundancy coding process for the write data and data obtained by inverting values of individual bits of the data resulting from the redundancy coding process for the write data, upon a specified address of a memory, the address being specified by an address signal;

reading data from the specified address of the memory;

comparing data written into the memory with data read from the memory; and writing the other one of the data resulting from the redundancy coding process for the write data and the data obtained by inverting values of individual bits of the data resulting from the redundancy coding process for the write data, upon the specified address of the memory, if comparison results in non-matching.

BRIEF DESCRIPTION OF THE DRAWINGS

FIG. 14 is a diagram showing a logical formula indicating a redundancy coding process according to a modification;

FIG. 16 is a diagram showing a logical formula indicating a redundancy coding process according to a modification;

FIG. 18 is a diagram showing a logical formula indicating a redundancy coding process according to a modification.

DESCRIPTION OF THE EMBODIMENTS

With reference to the drawings, hereinafter will be described an embodiment of the present invention.

Figure 1:
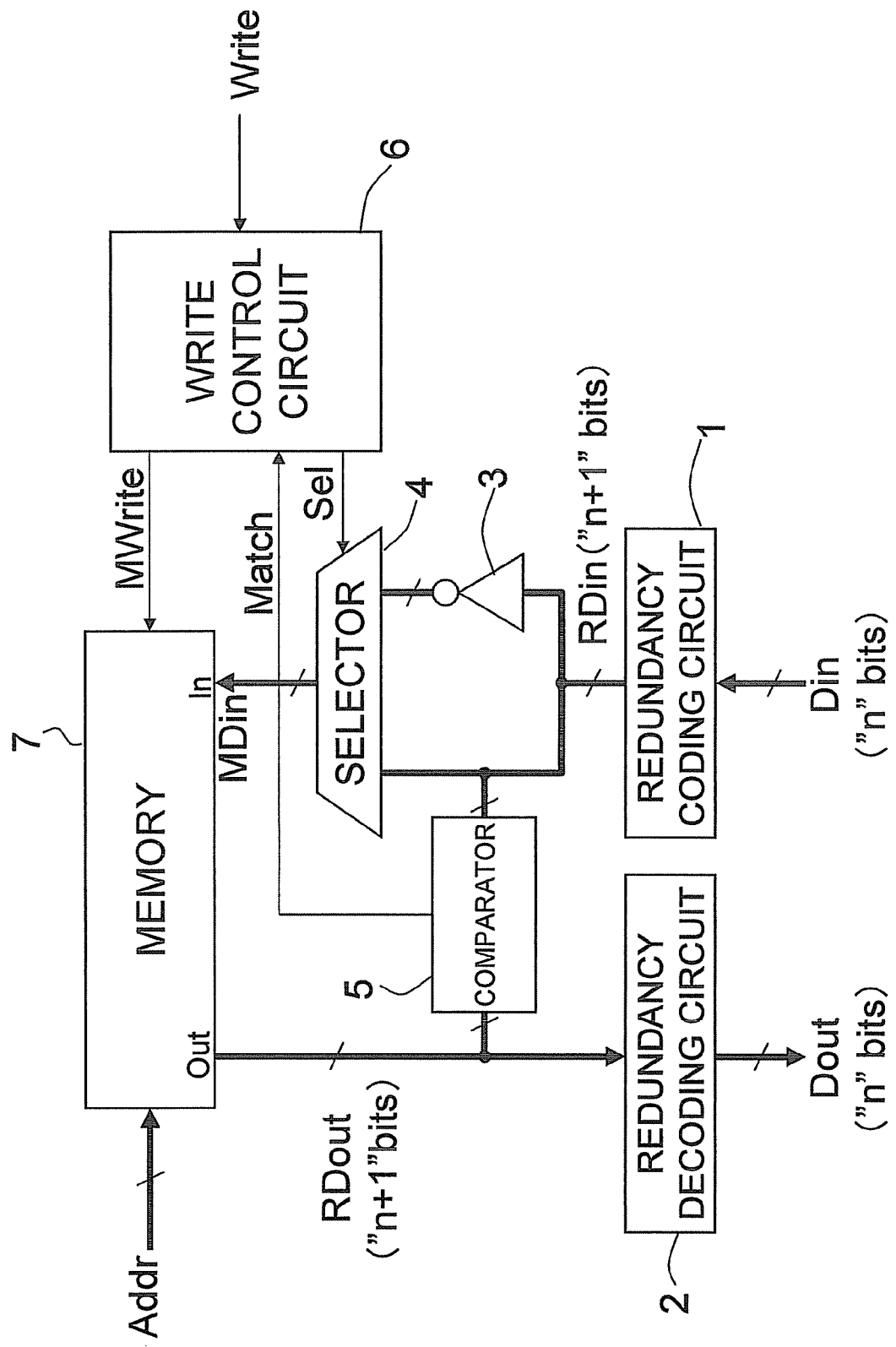
FIG. 1 is a schematic diagram of a memory system according to an embodiment of the present invention.

FIG. 1 is a schematic diagram illustrating a memory system related to the embodiment of the present invention. The memory system includes a redundancy coding circuit 1, a redundancy decoding circuit 2, an inverter 3, a selector 4, a comparator 5, a write control circuit 6 and a memory 7.

The redundancy coding circuit 1 is provided with an n-bit ("n" is an integer of "1" or more) data "Din" and performs a redundancy coding process to convert the data "Din" into an "n+1"-bit data "RDin" and output the converted data. A description on the redundancy coding process will be provided later. The inverter 3 is provided with the output of the redundancy coding circuit 1 and inverts and outputs a value of each bit.

The selector 4 is provided with the output of the redundancy coding circuit 1 and the output of the inverter 3 to select either one of the outputs based on a selecting signal "Sel" and output the selected output to the memory 7.

The memory 7 is a randomly accessible nonvolatile memory which is provided with a multiple-bit address signal "Addr" for specifying an address in the memory, which is subjected to writing or reading, and a write signal "MWrite" for instructing the timing of writing. A data "MDin" outputted from the selector 4 is written into an address specified by the address signal "Addr" with the timing based on the write signal "MWrite".

The comparator 5 compares an "n+1"-bit data "RDout" read from the memory 7 with the output "RDin" from the redundancy coding circuit 1 to output a comparison result signal "Match" indicative of comparison results to the write control circuit 6. The write control circuit 6 outputs the selecting signal "Sel" based on the value of the comparison result signal "Match". Also, the write control circuit 6 outputs the write signal "MWrite".

The redundancy decoding circuit 2 is provided with the "n+1"-bit data "RDout" that has been read from the memory 7, and performs a redundancy decoding process to convert the data into an n-bit data "Dout" and outputs the converted data.

Figures 2, 3:
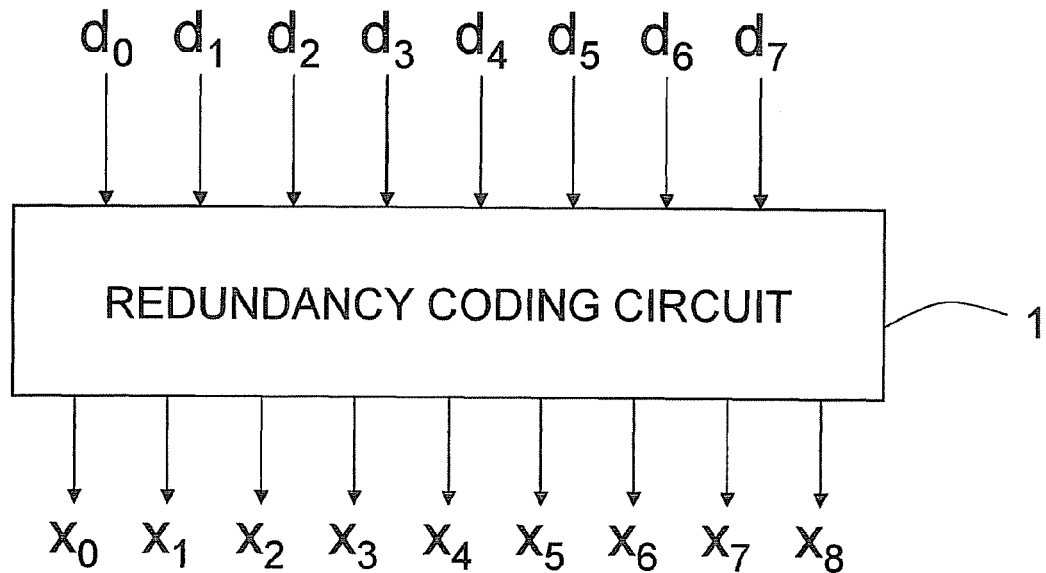
FIG. 2 is a diagram showing an example of a process performed by a redundancy coding circuit.
FIG. 3 is a diagram showing a logical formula as an example of a redundancy coding process.

Hereinafter are described the redundancy coding process and the redundancy decoding process, taking "n=8" as an example. As shown in FIG. 2, the redundancy coding circuit 1 is provided with an 8-bit data $d_0$, $d_1$, $d_2$, $d_3$, $d_4$, $d_5$, $d_6$ and $d_7$ and performs the redundancy coding process to output a 9-bit data $x_0$, $x_1$, $x_2$, $x_3$, $X_4$, $x_5$, $x_6$, $x_7$ and $x_8$.

Figure 4:
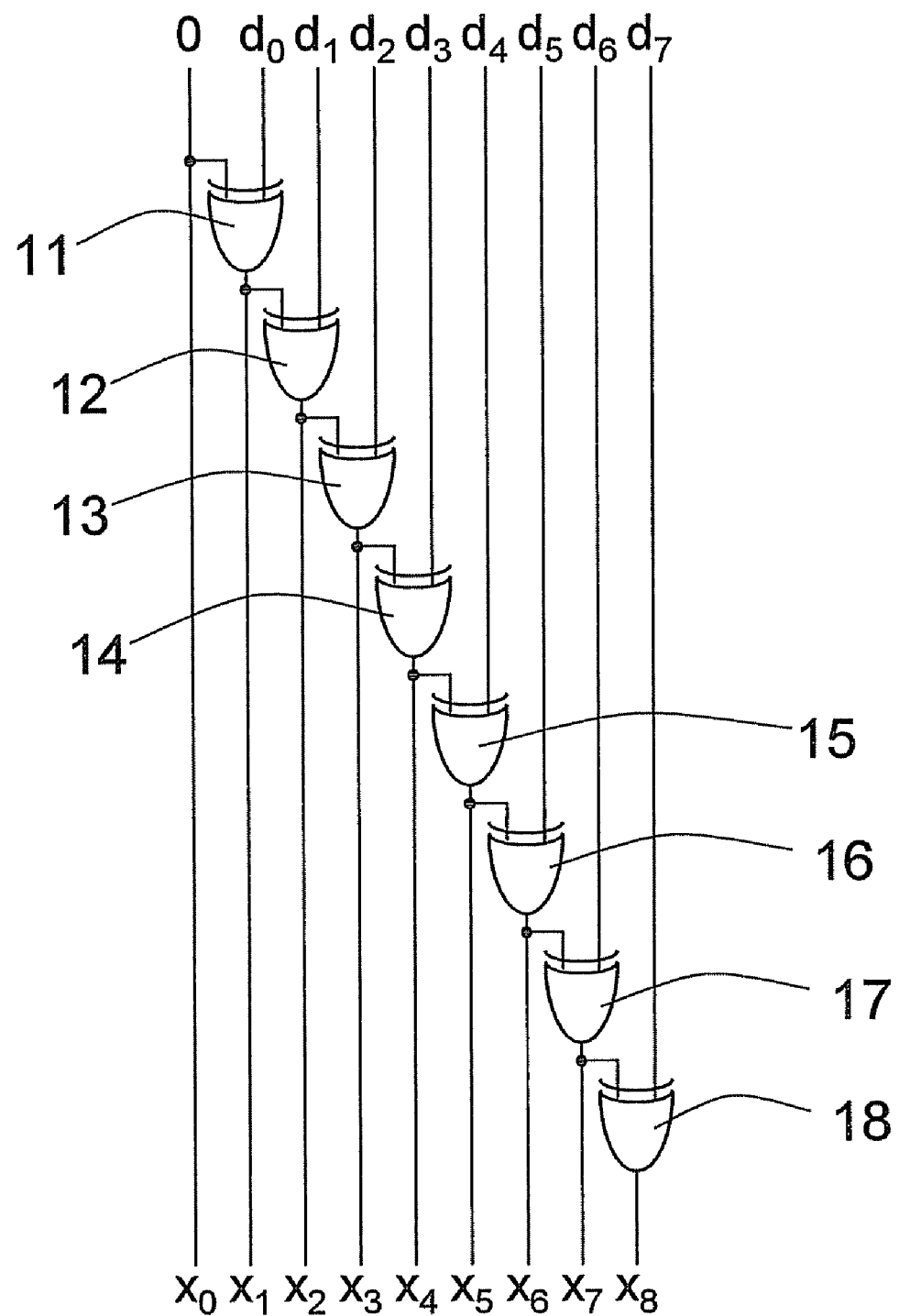
FIG. 4 is a circuit diagram illustrating an example of a redundancy coding circuit.

The redundancy coding process can be represented by a logical formula as shown in FIG. 3, and the redundancy coding circuit 1 can be configured by a logical circuit having XOR elements 11 to 18 as shown in FIG. 4. As the bit $x_0$ of the data to be outputted, "0" is outputted. The XOR element 11 is provided with "0" and the bit $d_0$, with its output resulting in the bit $x_1$.

The XOR element 12 is provided with the output of the XOR element 11 and the bit $d_1$, with its output resulting in the bit $x_2$. The same applies to the subsequent elements, that is, an XOR element "k($13 \leq k \leq 18$)" is provided with the output of an XOR element "k−1" and a bit "$d_{k-11}$", with its output resulting in a bit "$x_{k-10}$".

Figures 5, 6:
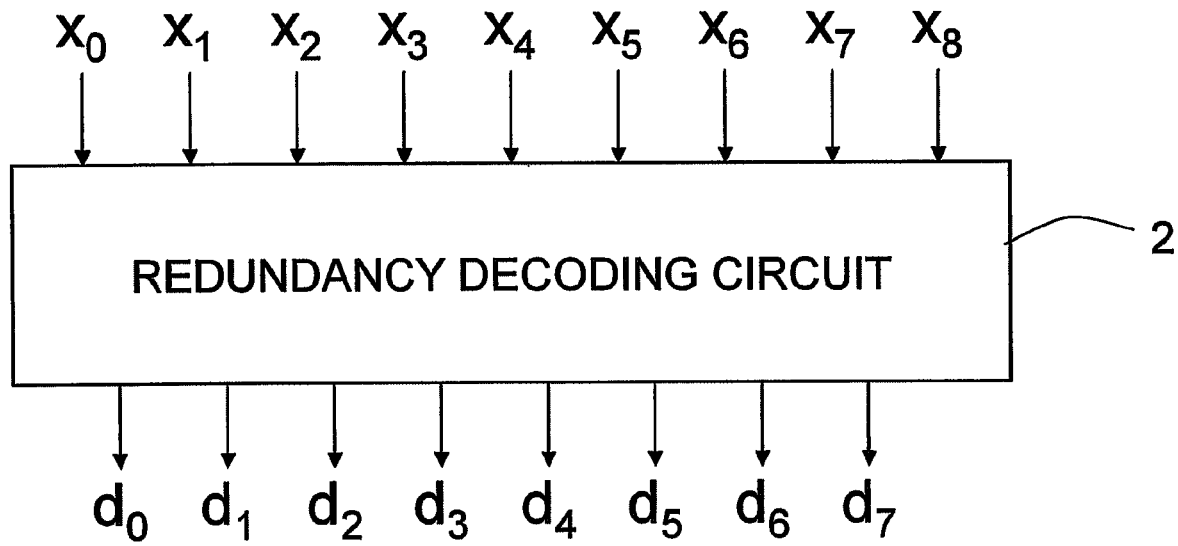
FIG. 5 is a diagram showing an example of a process performed by a redundancy decoding circuit.
FIG. 6 is a diagram showing a logical formula as an example of a redundancy decoding process.

As shown in FIG. 5, the redundancy decoding circuit 2 is provided with the 9-bit data $x_0$, $x_1$, $x_2$, $x_3$, $x_4$, $x_5$, $x_6$, $x_7$ and $x_8$ read from the memory 7 and performs the redundancy decoding process to output the 8-bit data $d_0$, $d_1$, $d_2$, $d_3$, $d_4$, $d_5$, $d_6$ and $d_7$.

Figure 7:
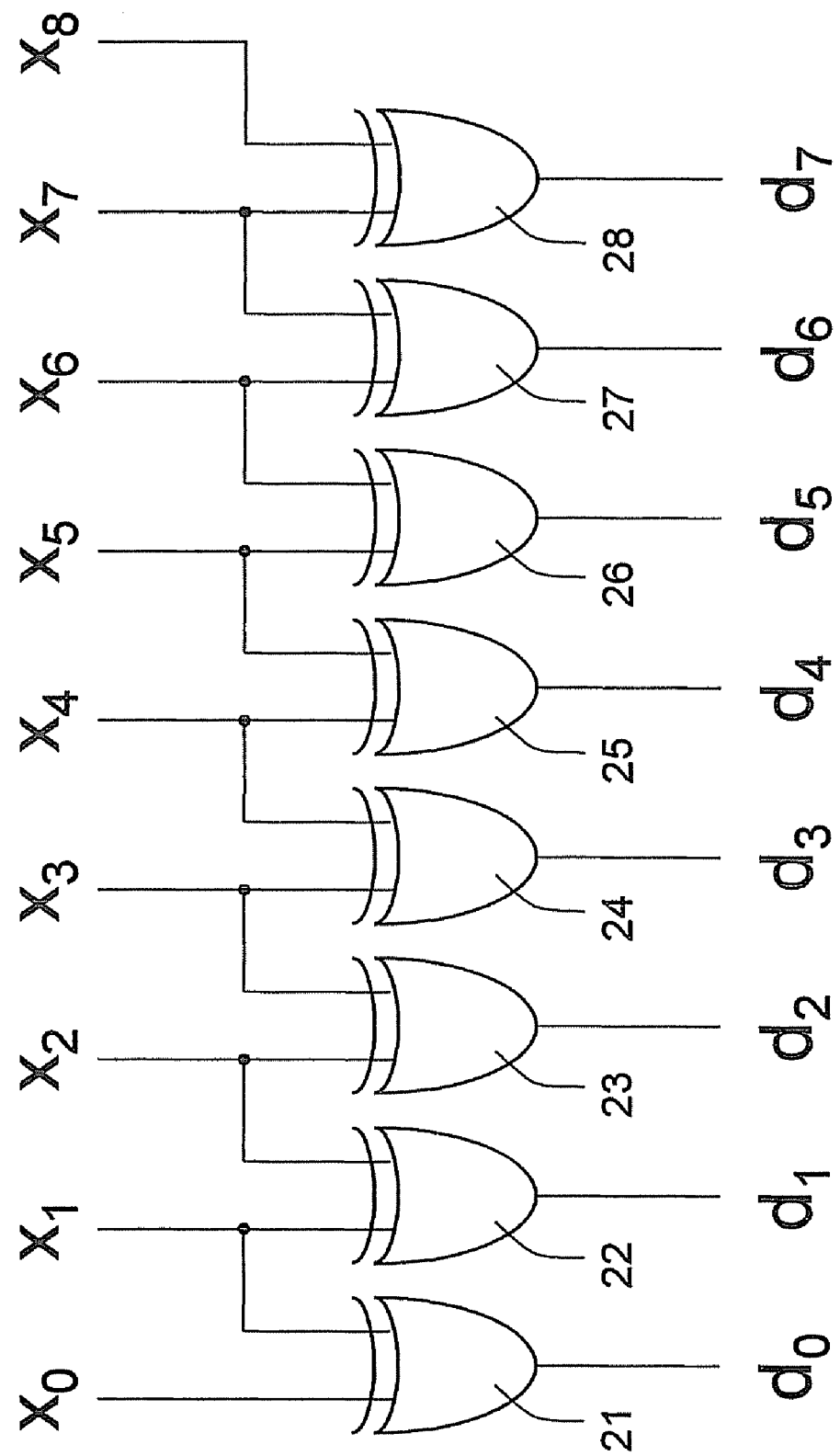
FIG. 7 is a circuit diagram illustrating an example of a redundancy decoding circuit.

The redundancy decoding process can be represented by a logical formula as shown in FIG. 6, and the redundancy decoding circuit 2 can be configured by a logical circuit having XOR elements 21 to 28 as shown in FIG. 7. The XOR element 21 is provided with the bits $x_0$ and $x_1$, with its output resulting in the bit $d_0$.

The same applies to the subsequent elements, that is, an XOR element "j($22 \leq j \leq 28$)" is provided with bits "$x_{j-21}$" and if "$x_{j-20}$", with its output resulting in a bit "$d_{j-21}$".

As will be understood from the logical formulae shown in FIGS. 3 and 6, when the 9-bit data $x_0$, $x_1$, $x_2$, $x_3$, $x_4$, $x_5$, $x_6$, $x_7$ and $x_8$ resulting from the redundancy coding process of the 8-bit data $d_0$, $d_1$, $d_2$, $d_3$, $d_4$, $d_5$, $d_6$ and $d_7$, is subjected to the redundancy decoding process, the original 8-bit data $d_0$, $d_1$, $d_2$, $d_3$, $d_4$, $d_5$, $d_6$ and $d_7$ can be restored.

The original 8-bit data $d_0$, $d_1$, $d_2$, $d_3$, $d_4$, $d_5$, $d_6$ and $d_7$ can also be restored by negating the individual 9-bit data $x_0$, $x_1$, $x_2$, $x_3$, $x_4$, $x_5$, $x_6$, $x_7$ and $x_8$ (by inverting the individual bits) and then subjecting the resultant to the redundancy decoding process.

For example, let us discuss a case where the 8-bit data is "01100011". When this value is provided to the redundancy coding circuit shown in FIG. 4, a 9-bit data "001000010" is outputted. When this value "001000010" is provided to the redundancy decoding circuit shown in FIG. 7, the output will be "01100011", thereby restoring the original data.

Further, when a value "110111101", a negation of the 9-bit data "001000010", is provided to the redundancy decoding circuit shown in FIG. 7 as well, the output will be "01100011", thereby restoring the original data.

Of memory cells storing the 9-bit data $x_0$, $x_1$, $x_2$, $x_3$, $x_4$, $x_5$, $x_6$, $x_7$ and $x_8$ after the redundancy coding process, any one memory cell can be a bad memory cell that may constantly read only "0" (or "1"). In such a case, when a value of the bit to be stored in the bad memory cell is "0" (or "1"), the data $x_0$, $x_1$, $x_2$, $x_3$, $x_4$, $x_5$, $x_6$, $x_7$ and $x_8$ is ensured to be written. When a value of the bit to be stored in the bad memory cell is "1" (or "0"), a negation of the data $x_0$, $x_1$, $x_2$, $x_3$, $x_4$, $x_5$, $x_6$, $x_7$ and $x_8$ is ensured to be written. Thus, the value to be stored in the bad memory cell can be permitted to match the value that can be read from the bad memory cell.

The redundancy decoding process can restore the identical data $d_0$, $d_1$, $d_2$, $d_3$, $d_4$, $d_5$, $d_6$ and $d_7$, whether the data read from the memory is $x_0$, $x_1$, $x_2$, $x_3$, $x_4$, $x_5$, $x_6$, $x_7$ and $x_8$, or whether the data is a negation of the individual bits $x_0$, $x_1$, $x_2$, $x_3$, $x_4$, $x_5$, $x_6$, $x_7$ and $x_8$. Thus, correct data reading can be realized.

For example, let us assume that, of the memory cells storing the 9-bit data "001000010" after the redundancy coding process, the third bit from the left is a bad memory cell that can only read "0". In this case, if a negation "110111101" of the individual bits has been written in the memory 7, correct data can be read by carrying out the redundancy decoding process.

Figure 8:
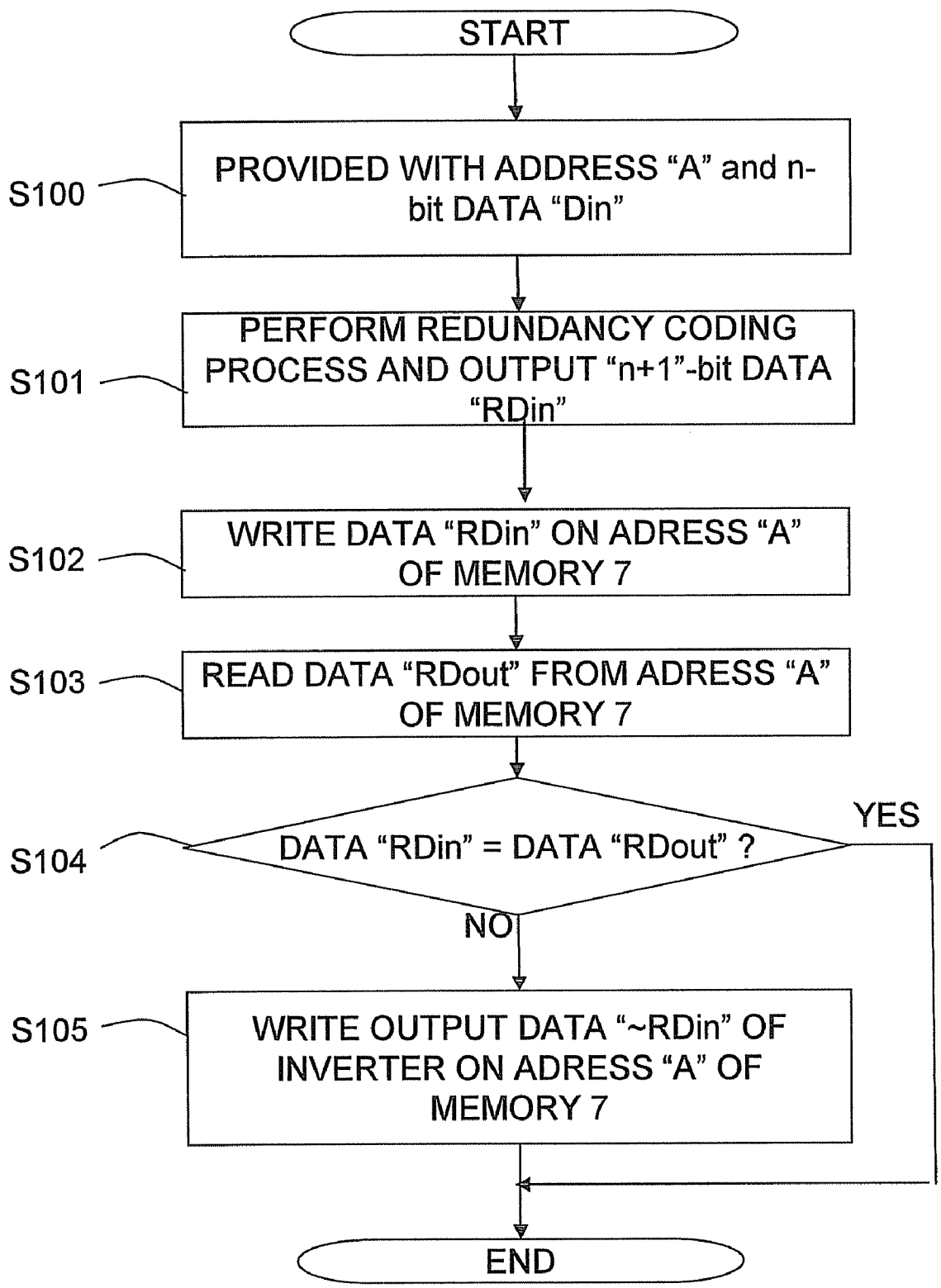
FIG. 8 is a flow diagram illustrating a method for writing data according to the embodiment.

The memory system according to the embodiment of the present invention is connected to hardware, such as a microprocessor, to carry out writing/reading of data. Referring now to the flow diagram shown in FIG. 8, hereinafter is explained a method for writing data using such a memory system.

The explanation here is provided by taking an example where a microprocessor writes data into the memory system. This explanation is applicable to the case where hardware other than the microprocessor carries out writing data. In order to write data into the memory system, the microprocessor outputs an address desired to be written, to the address signal "Addr" of the memory system, and outputs data desired to be written, to the data signal "Din" of the memory system. Then, the microprocessor alters the output for the write signal "Write" of the memory system, from the logical value "0" to "1" to start a writing process of the memory system.

(Step S100) An address "A" where data is to be written upon is provided from the microprocessor to the memory 7 by the address signal "Addr". Also, the n-bit data "Din" is provided from the microprocessor to the redundancy coding circuit 1.

(Step S101) The redundancy coding process is performed by the redundancy coding circuit 1 to output the "n+1"-bit data "RDin".

(Step S102) The selecting signal "Sel" is outputted from the write control circuit 6 so that the selector 4 can select the data "RDin". Further, the write control circuit 6 gives writing instructions to the memory 7, while altering the logical value from "0" to "1" for the write signal "MWrite" provided to the memory 7, by which the data "RDin" is written on the address "A" of the memory 7.

(Step S103) The data "RDout" is read from the address "A" of the memory 7.

(Step S104) The comparator 5 compares the data "RDin" with the data "RDout" to output the comparison result signal "Match" indicative of the comparison results. If the comparison result signal "Match" is true, that is, if the data "RDin" matches the data "RDout", the write control circuit 6 determines that the data has been correctly written into the memory 7 and ends the writing operation.

If the comparison result signal "Match" is false, that is, if the data "RDin" does not match the data "RDout", the control proceeds to step S105.

(Step S105) The selecting signal "Sel" is outputted from the write control circuit 6, so that the selector 4 can select the output of the inverter 3, i.e. a value "~RDin" which is a negation of the individual bits of the data "RDin". Further, the write control circuit 6 gives writing instructions to the memory 7, while altering the logical value from "0" to "1" for the write signal "MWrite" provided to the memory 7, by which the data "~RDin" is written on the address "A" of the memory 7.

Figure 9:
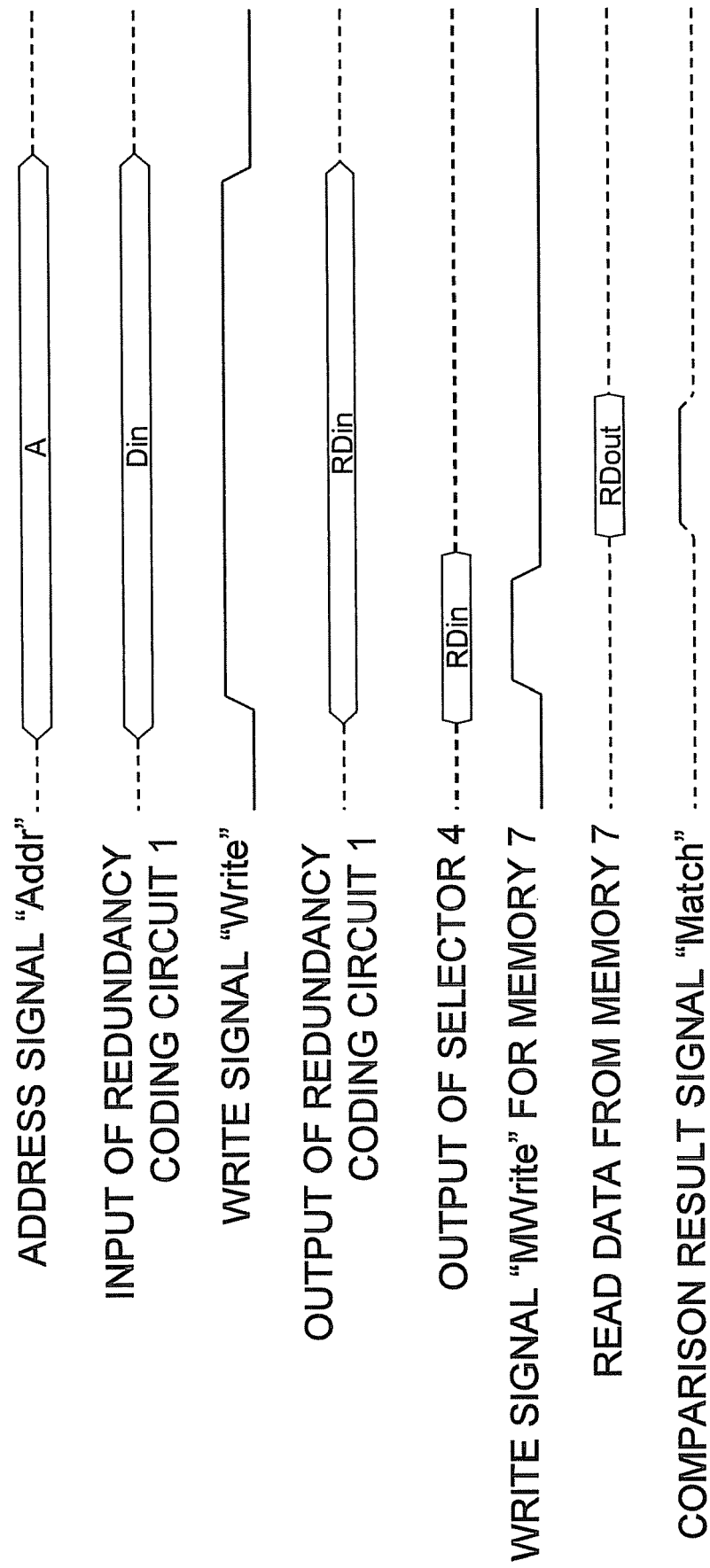
FIG. 9 is a diagram showing an example of a timing diagram in the method for writing data according to the embodiment.
Figure 10:
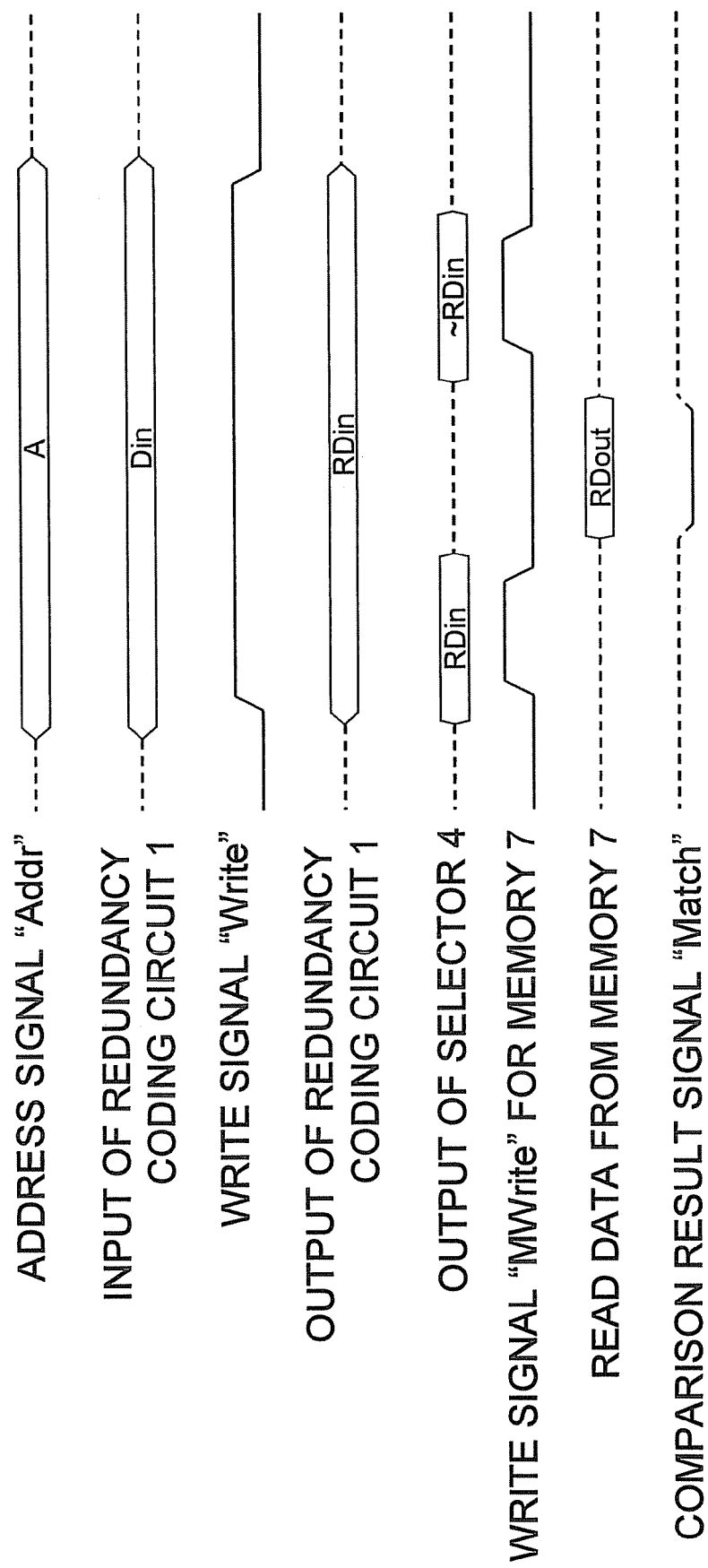
FIG. 10 is a diagram showing an example of a timing diagram in the method for writing data according to the embodiment.

FIG. 9 shows a timing diagram in the case where the comparison results at step S104 indicate matching. FIG. 10 shows a timing diagram in the case where the comparison results at step S104 indicate non-matching.

When the comparison result signal "Match" is true at step S104 and the data is determined as having been correctly written into the memory 7, the embodiment may be such that the data "RDin" is rewritten, instead of ending the writing operation.

The comparator 5 may be adapted to compare the data "RDout" read from the memory 7 with the output "~RDin" of the inverter 3, instead of making comparison between the data "RDout" read from the memory 7 and the output "RDin" from the redundancy coding circuit 1. In this case, the "~RDin" is written into the memory 7, at step S102, from the output of the inverter 3. Then, at step S104, comparison is made between the data "~RDin" and the data "RDout". If the comparison results in non-matching, the data "RDin" is written into the memory 7 at step S105.

Figure 11:
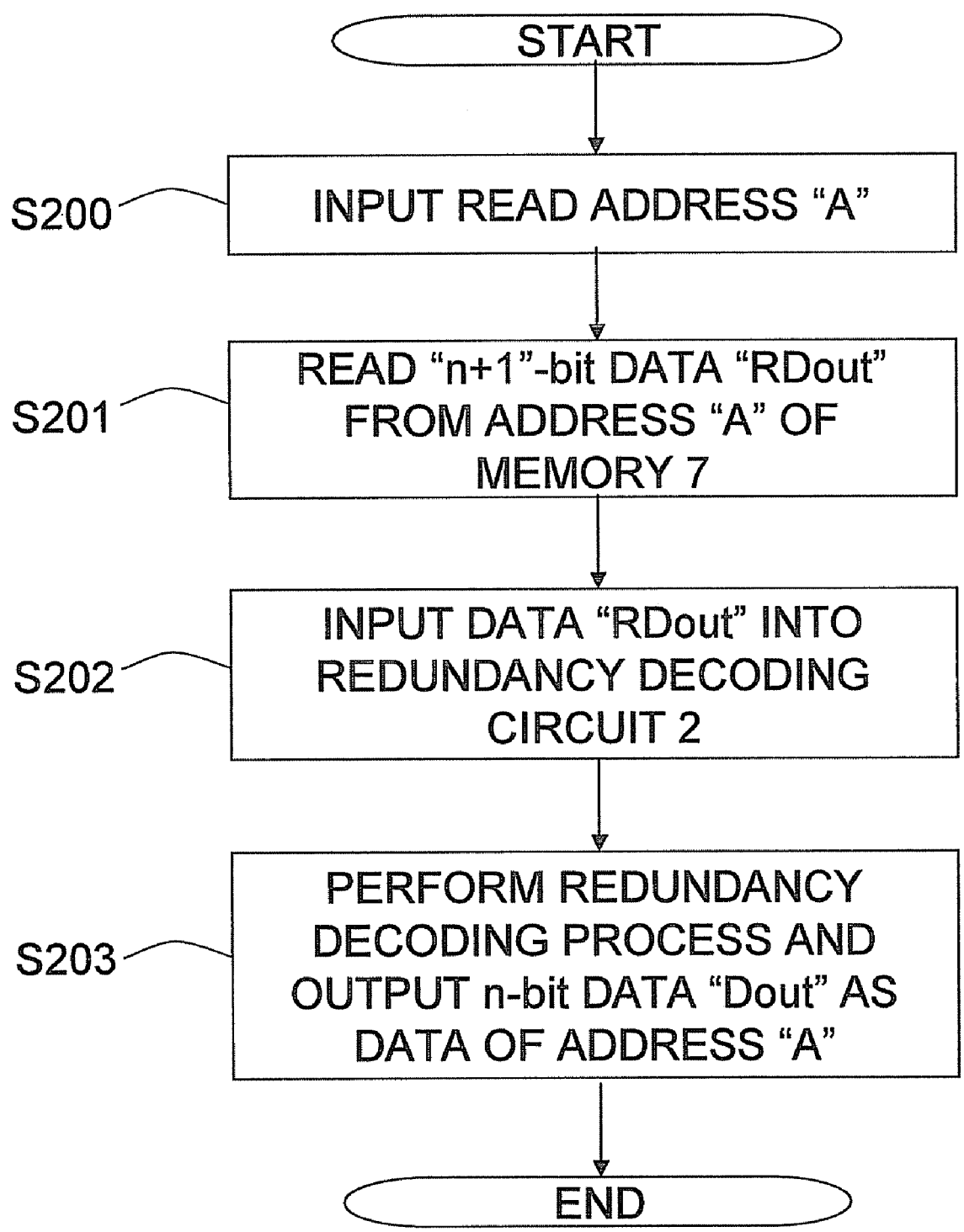
FIG. 11 is a flow diagram illustrating a method for reading data according to the embodiment.

Referring now to the flow diagram shown in FIG. 11, hereinafter is explained a method for reading data. In order to read data from the memory system, the microprocessor outputs an address desired to be read, to the address signal "Addr" of the memory system to start a reading process of the memory system.

(Step S200) The address "A" is provided from the microprocessor by the address signal "Addr".

(Step S201) The "n+1"-bit data "RDout" is read from the address "A" of the memory 7.

(Step S202) The data "RDout" is provided to the redundancy decoding circuit 2.

(Step S203) The redundancy decoding process is performed to have the n-bit data "Dout" outputted as data of the address "A" of the memory 7.

Use of the redundancy coding process and the redundancy decoding process enables correct writing/reading of data even when there exists one bad memory cell corresponding to one bit, among the memory cells of the memory 7, which correspond to "n+1" bits. It should be appreciated that the value of "n" can be set to a small value when there are many bad memory cells in the memory 7, and to a large value when there are a little bad memory cells.

With the memory access method described above, bad memory cells can be remedied at higher efficiency than the case of using ordinary ECCs. For example, when "n=8" is satisfied in the memory access method of the present embodiment, the redundancy coding process can be carried out for the 8-bit data to have the data turned to the 9-bit data. Thus, of the 9-bit memory cells, one bad memory cell corresponding to one bit can be remedied. In other words, one bad memory cell corresponding to one bit can be remedied by adding a redundancy bit corresponding to one bit, to the 8-bit data.

On the other hand, in the case of using "single error correction double error detection" (SECDED), the ratio between the data bits and the redundancy bits is equal to that of the example described above, that is, "8" redundancy bits are added to 64-bit data. In this case, of the 72-bit memory cells, only one bad memory cell corresponding to one bit can be remedied.

In the present embodiment, performing writing for the memory requires two writings at the maximum and one reading for the memory 7. Thus, comparing the writing in the present embodiment with the case of the "self-referencing reading" requiring only one writing, writing speed is deteriorated.

However, in the present embodiment, performing reading from the memory requires only one reading, whereas the "self-referencing reading" requires two readings and two writings. Thus, reading can be sped up in the present embodiment.

Generally, frequency of performing writing on a memory is lower than the frequency of performing reading therefrom. Hence, it is high-speed reading that can reduce more the total access time for the memory, whereby the memory can be efficiently used.

As described above, the memory system according to the present embodiment can remedy the bad memory cells of an electrically rewritable memory with high efficiency, and reduce the access time for the memory to efficiently use the memory.

Figure 12:
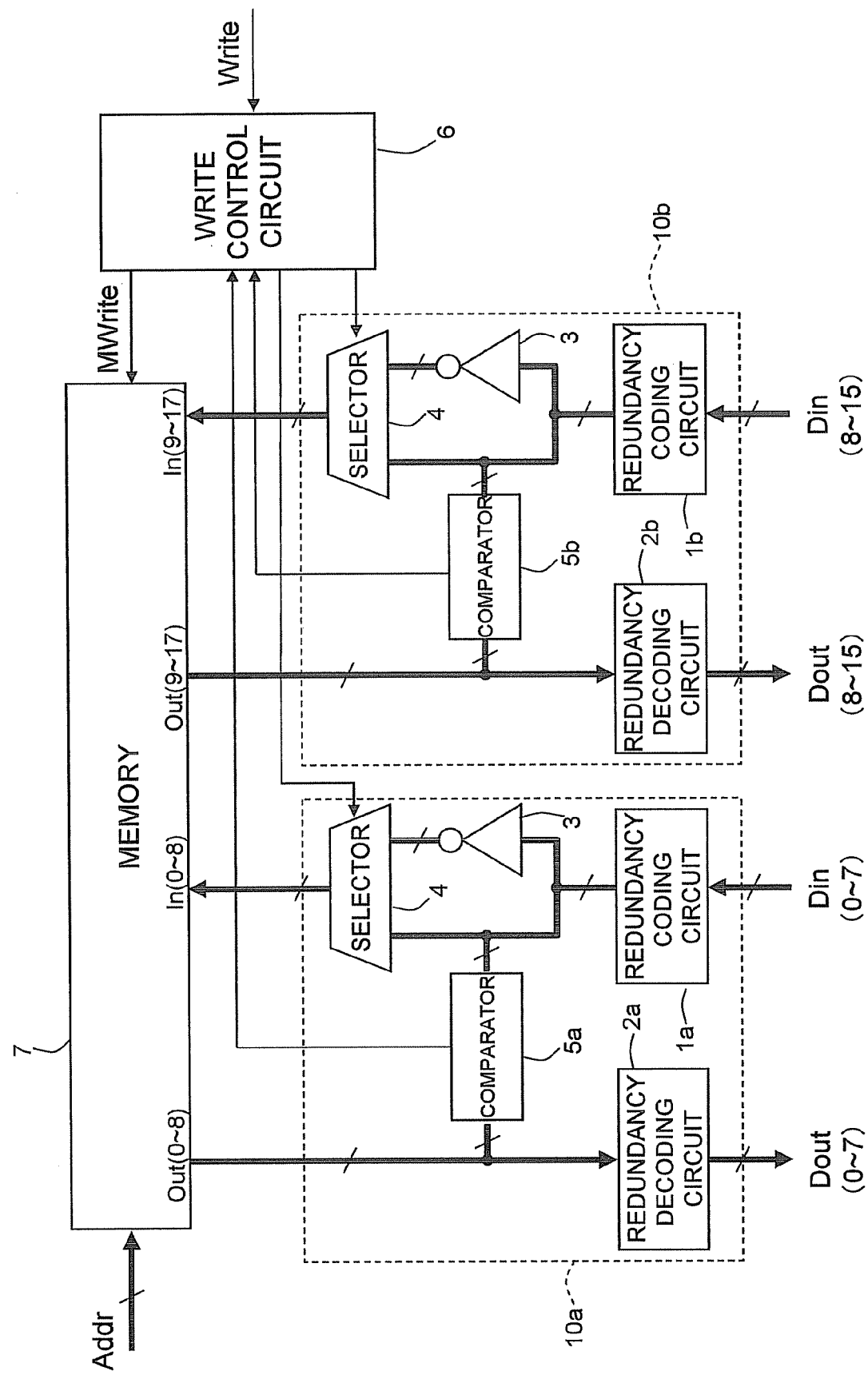
FIG. 12 is a schematic diagram illustrating a memory system according to a modification.

In the embodiment described above, data width for performing reading/writing for the memory 7 has been in conformity with the unit that is subjected to the redundancy coding process for storage. However, the both may be differentiated. For example, in the case where read/write data width is "16" bits, and the unit for the redundancy process is "8" bits, the 16-bit data may be divided into "8" bits of high order and "8" bits of low order, as shown in FIG. 12, for provision to two redundancy process blocks 10a and 10b, respectively. Then, the redundancy coding processes may be performed for the individual blocks in redundancy coding circuits 1a and 1b, respectively, for writing into the memory 7.

Then, the data written into the memory 7 may be compared with the data read from the memory 7 by comparators 5a and 5b. If the comparison results in matching in each of the blocks, the writing operation is ended. If the comparison results in non-matching in either one of the blocks, the non-matched block is outputted by permitting the selector 4 to select the output of the inverter 3, for writing into the memory 7. As to the matched block, it is ensured that the same value is rewritten into the memory 7.

In this way, when the read/write data width for the memory 7 is different from the unit for the redundancy process, a plurality of redundancy process blocks may be provided, so that the same advantages as in the above embodiment can be obtained.

The configuration of the redundancy coding circuit in the above embodiment is not limited to the one shown in FIG. 4. For example, the XOR element 11 that is a redundant logical element may be omitted from the configuration shown in FIG. 4 to provide a configuration shown in FIG. 13.

Also, the redundancy coding circuit may carry out a redundancy coding process as expressed by a logical formula shown in FIG. 14. Logical circuits with the configurations shown in FIGS. 15A and 15B may each serve as a redundancy coding circuit for realizing such a process.

Figure 17B:
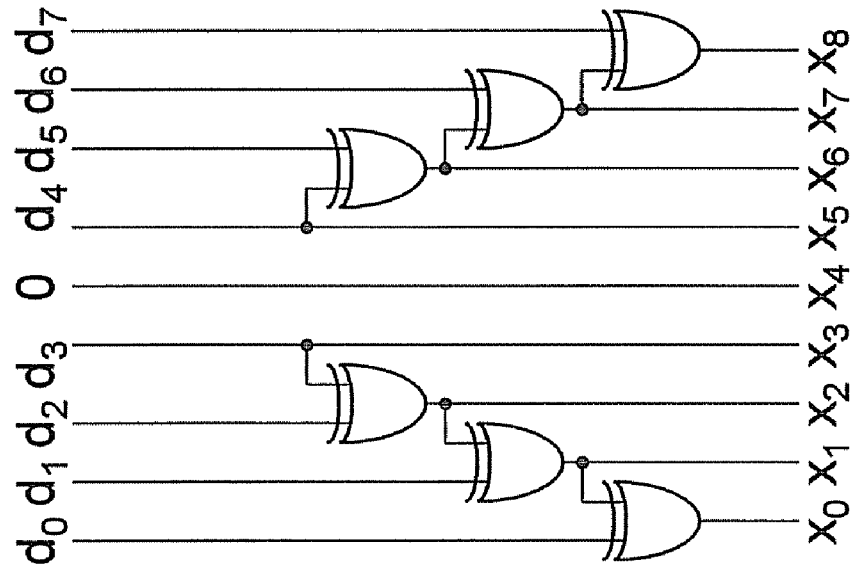
FIGS. 17A and 17B are circuit diagrams illustrating a redundancy coding circuit according to a modification.
Figure 17A:
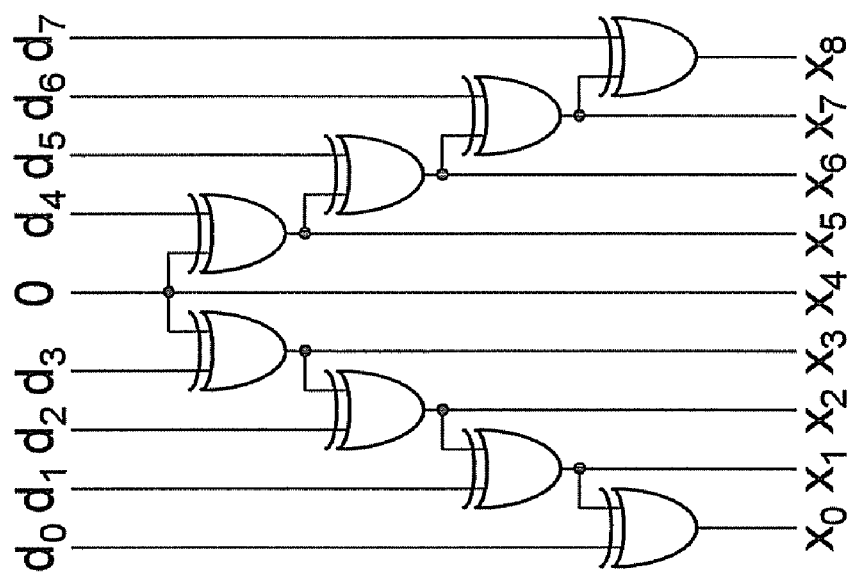
Figure 19B:
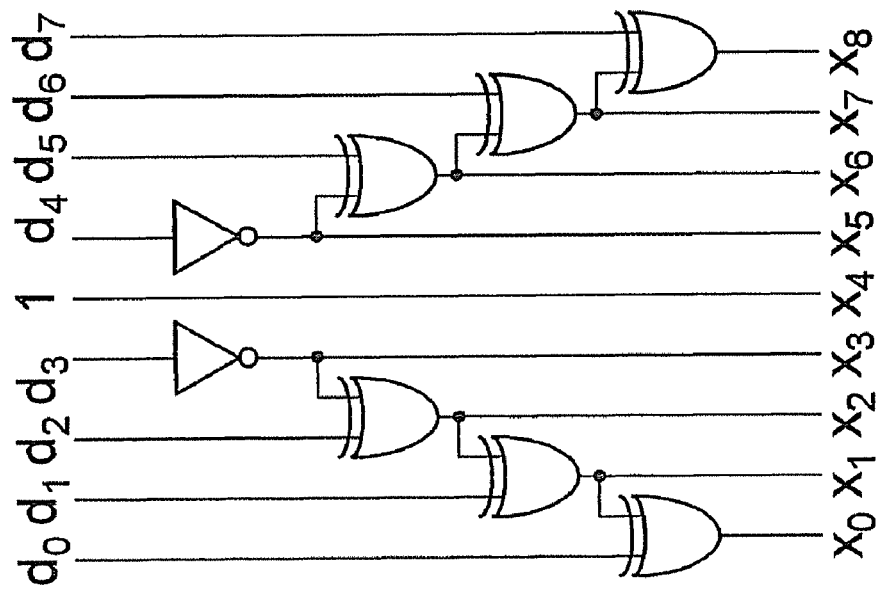
FIGS. 19A and 19B are circuit diagrams illustrating a redundancy coding circuit according to a modification.
Figure 19A:
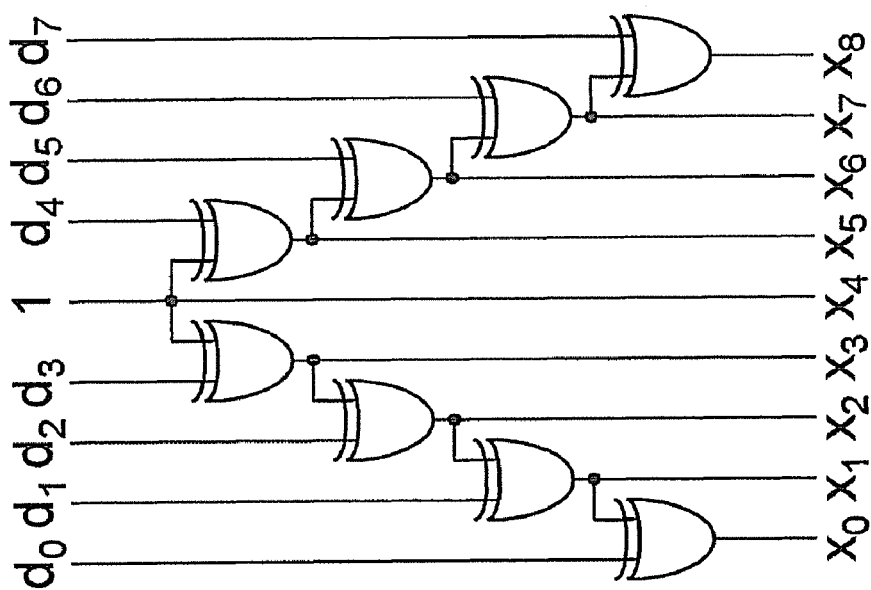

Alternatively, a redundancy coding process as expressed by a logical formula shown in FIG. 16 may be performed. Logical circuits with the configurations shown in FIGS. 17A and 17B may each serve as a redundancy coding circuit for realizing such a process. Alternatively, a redundancy coding process as expressed by a logical formula shown in FIG. 18 may be performed. Logical circuits with the configurations shown in FIGS. 19A and 19B may each serve as a redundancy coding circuit for realizing such a process.

Figure 13:
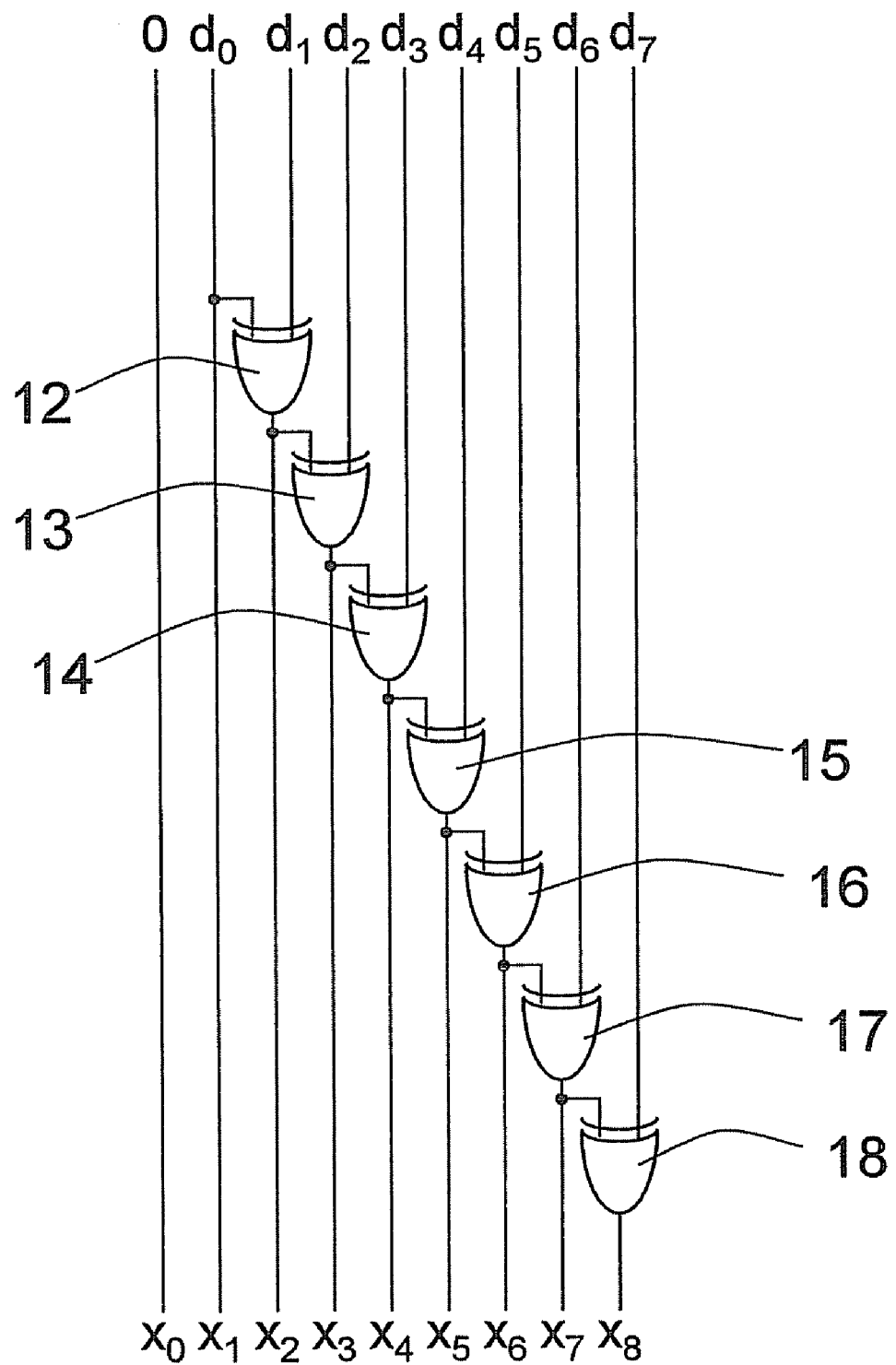
FIG. 13 is a circuit diagram illustrating a redundancy coding circuit according to a modification.
Figure 15B:
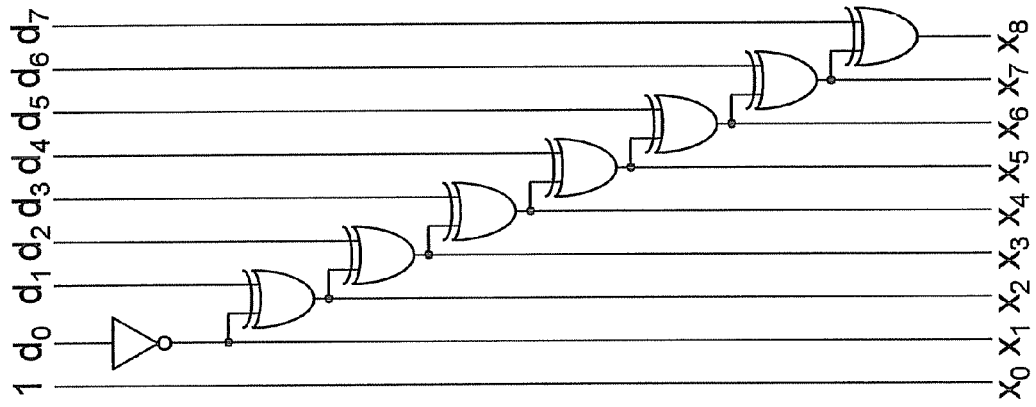
FIGS. 15A and 15B are circuit diagrams illustrating a redundancy coding circuit according to a modification.
Figure 15A:
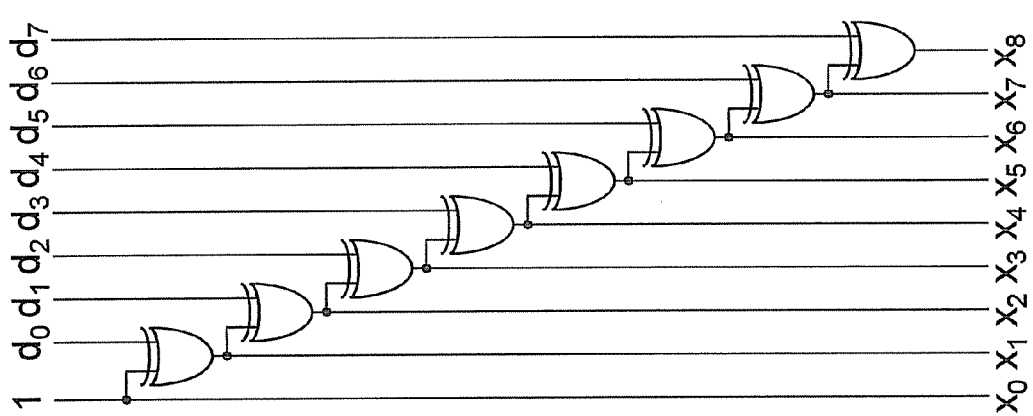

The redundancy coding circuits shown in FIGS. 17A, 17B, 19A and 19B can be operated at high speed because these circuits have less XOR-element stages comparing with the redundancy coding circuits shown in FIGS. 13, 15A and 15B.

Of the "n+1"-bit data that have resulted from the redundancy coding process, the one bit to be fixed to "0" or "1" may be any of the first to "n+1"$^{th}$ bits. The one bit to be fixed to "0" or "1", if it is located the nearer to the center of the "n+1" bits, may permit the redundancy coding circuit to have the less number of stages of the logical elements, whereby high-speed operation can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
   a redundancy coding circuit that performs redundancy coding process for write data;
   an inverter circuit provided with data that has resulted from the redundancy coding process performed by the redundancy coding circuit to invert values of individual bits of the data that has resulted from the redundancy coding process;
   a selector provided with the data that has resulted from the redundancy coding process and data that has been inverted by the inverter circuit to make a selection of either one of the data based on a selecting signal;
   a memory that stores the data selected by the selector;
   a comparator that compares data read from the memory with either one of the data that has resulted from the redundancy coding process and the data inverted by the inverter circuit to output a comparison result signal indicative of comparison results;
   a write control circuit that controls writing of the memory, while being provided with the comparison result signal to produce and output the selecting signal based on the comparison results indicated by the comparison result signal; and
   a redundancy decoding circuit that performs a redundancy decoding process for data read from the memory to output the processed data.

2. The memory system according to claim 1, wherein a value resulting from the redundancy decoding process performed for the data that has resulted from the redundancy coding process, and a value resulting from the redundancy decoding process performed for the data that has been inverted by the inverter circuit, are both equal to the write data.

3. The memory system according to claim 1, wherein:
   when the comparator compares data read from the memory with data resulting from the redundancy coding process, the write control circuit outputs the selecting signal so that the selector can select and output data resulting from the redundancy coding process and, at the same time, outputs a write signal indicative of timing for performing writing for the memory, and further outputs the selecting signal so that the selector can select and output data inverted by the inverter circuit when the comparison results indicate non-matching and, at the same time, outputs the write signal; and
   when the comparator compares data read from the memory with data inverted by the inverter circuit, the write control circuit outputs the selecting signal so that the selector can select and output data inverted by the inverter circuit and, at the same time, outputs the write signal, and further outputs the selecting signal so that the selector can select and output data resulting from the redundancy coding process when the comparison results indicate non-matching and, at the same time, outputs the write signal.

4. The memory system according to claim 1, wherein:
when the write data has "n" bits ("n" is an integer of "1" or more), data resulting from a redundancy coding process and data read from the memory have "n+1" bits, and data resulting from the redundancy decoding process has "n" bits.

5. The memory system according to claim 4, wherein:
the redundancy coding circuit has an "n−1" number of XOR gates;
a first XOR gate is provided with first and second bits of the write data;
a "$k$"$^{th}$ XOR gate ("k" is an integer satisfying "2≦k≦n−1") is provided with an output value of a "k−1"$^{th}$ XOR gate and a "k+1"$^{th}$ bit of the write data; and
a value "0" is outputted as a first bit of output, a value equal to the first bit of the write data is outputted as a second bit, an output value of the first XOR gate is outputted as a third bit, and an output value of the "$k$"$^{th}$ XOR gate is outputted as a "k+2"$^{th}$ bit.

6. The memory system according to claim 4, wherein:
the redundancy coding circuit has an "n" number of XOR gates;
a first XOR gate is provided with a first bit of the write data and a value "1",
a "$k$"$^{th}$ XOR gate ("k" is an integer satisfying "2≦k≦n") is provided with an output value of a "k−1"$^{th}$ XOR gate and a "$k$"$^{th}$ bit of the write data; and
a value "1" is outputted as a first bit of output, an output value of the first XOR gate is outputted as a second bit, and an output value of the "$k$"$^{th}$ XOR gate is outputted as a "k+1"$^{th}$ bit.

7. The memory system according to claim 4, wherein:
the redundancy coding circuit has a NOT gate and an "n−1" number of XOR gates, the NOT gate being provided with a first bit of the write data;
a first XOR gate is provided with an output value of the NOT gate and a second bit of the write data;
a "$k$"$^{th}$ XOR gate ("k" is an integer satisfying "2≦k≦n−1") is provided with an output value of a "k−1"$^{th}$ XOR gate and a "k+1"$^{th}$ bit of the write data; and
a value "1" is outputted as a first bit of output, an output value of the NOT gate is outputted as a second bit, an output value of the first XOR gate is outputted as a third bit, and an output value of the "$k$"$^{th}$ XOR gate is outputted as a "k+2"$^{th}$ bit.

8. The memory system according to claim 4, wherein:
the redundancy coding circuit has a "2m−2" number ("m" is an integer satisfying "2m=n") of XOR gates;
a first XOR gate is provided with an "$m$"$^{th}$ bit and an "m−1"$^{th}$ bit of the write data;
a "$j$"$^{th}$ XOR gate ("j" is an integer satisfying "2≦j≦m−1") is provided with an output value of a "j−1"$^{th}$ XOR gate and an "m−j"$^{th}$ bit of the write data;
an "$m$"$^{th}$ XOR gate is provided with an "m+1"$^{th}$ bit and an "m+2"$^{th}$ bit of the write data;
a "$k$"$^{th}$ XOR gate ("k" is an integer satisfying "m+1≦k≦2m−2") is provided with an output value of a "k−1"$^{th}$ XOR gate and a "k+2"$^{th}$ bit of the write data; and
an output value of the "$j$"$^{th}$ XOR gate is outputted as an "m−j"$^{th}$ bit of output, an output value of the first XOR gate is outputted as an "m−1"$^{th}$ bit, a value equal to an "$m$"$^{th}$ bit of the write data is outputted as an "$m$"$^{th}$ bit, a value "0" is outputted as an "m+1"$^{th}$ bit, a value equal to an "m+1"$^{th}$ bit of the write data is outputted as an "m+2"$^{th}$ bit, an output value of the "$m$"$^{th}$ XOR gate is outputted as an "m+3"$^{th}$ bit, and an output value of the "$k$"$^{th}$ XOR gate is outputted as an output of a "k+3"$^{th}$ bit.

9. The memory system according to claim 4, wherein:
the redundancy coding circuit has a "2m" number ("m" is an integer satisfying "2m=n") of XOR gates;
a first XOR gate is provided with an "$m$"$^{th}$ bit of the write data and a value "1";
a "$j$"$^{th}$ XOR gate ("j" is an integer satisfying "2≦j≦m") is provided with an output value of a "j−1"$^{th}$ XOR gate and an "m−j+1"$^{th}$ bit of the write data;
an "m+1"$^{th}$ XOR gate is provided with an "m+1"$^{th}$ bit of the write data and a value "1";
a "$k$"$^{th}$ XOR gate ("k" is an integer satisfying "m+2≦k≦2m") is provided with an output value of a "k−1"$^{th}$ XOR gate and a "$k$"$^{th}$ bit of the write data; and
an output value of the "$j$"$^{th}$ XOR gate is outputted as an "m−j+1"$^{th}$ bit of output, an output value of the first XOR gate is outputted as an "$m$"$^{th}$ bit, a value "1" is outputted as an "m+1"$^{th}$ bit, an output value of the "m+1"$^{th}$ XOR gate is outputted as an "m+2"$^{th}$ bit, and an output value of the "$k$"$^{th}$ XOR gate is outputted as an output of a "k+1"$^{th}$ bit.

10. The memory system according to claim 4, wherein:
the redundancy coding circuit has a "2m−2" number ("m" is an integer satisfying "2m=n") of XOR gates and two NOT gates;
a first NOT gate is provided with an "$m$"$^{th}$ bit of the write data;
a second NOT gate is provided with an "m+1"$^{th}$ bit of the write data;
a first XOR gate is provided with an "m−1"$^{th}$ bit of the write data and an output value of the first NOT gate;
a "$j$"$^{th}$ XOR gate ("j" is an integer satisfying "2≦j≦m−1") is provided with an output value of a "j−1"$^{th}$ XOR gate and an "m−j"$^{th}$ bit of the write data;
an "$m$"$^{th}$ XOR gate is provided with an "m+2"$^{th}$ bit of the write data and an output value of the second NOT gate;
a "$k$"$^{th}$ XOR gate ("k" is an integer satisfying "m+1≦k≦2m−2") is provided with an output value of a "k−1"$^{th}$ XOR gate and a "k+2"$^{th}$ bit of the write data; and
an output value of the "$j$"$^{th}$ XOR gate is outputted as an "m−j"$^{th}$ bit of output, an output value of the first XOR gate is outputted as an "m−1"$^{th}$ bit, an output value of the first NOT gate is outputted as an "$m$"$^{th}$ bit, a value "1" is outputted as an "m+1"$^{th}$ bit, an output value of the second NOT gate is outputted as an "m+2"$^{th}$ bit, an output value of the "$m$"$^{th}$ XOR gate is outputted as an "m+3"$^{th}$ bit, and an output value of the "$k$"$^{th}$ XOR gate is outputted as an output of a "k+3"$^{th}$ bit.

11. The memory system according to claim 4, wherein:
the redundancy decoding circuit has an "n" number of XOR gates;
a "$k$"$^{th}$ XOR gate ("k" is an integer satisfying "1≦k≦n") is provided with a "$k$"$^{th}$ bit and a "k+1"$^{th}$ bit of data read from the memory; and
an output value of the "$k$"$^{th}$ XOR gate is outputted as a "$k$"$^{th}$ bit of output.

12. A memory access method, comprising:
performing a redundancy coding process for write data;
writing either one of data resulting from the redundancy coding process for the write data and data obtained by inverting values of individual bits of the data resulting from the redundancy coding process for the write data, upon a specified address of a memory, the address being specified by an address signal;

reading data from the specified address of the memory;

comparing data written into the memory with data read from the memory; and writing the other one of the data resulting from the redundancy coding process for the write data and the data obtained by inverting values of individual bits of the data resulting from the redundancy coding process for the write data, upon the specified address of the memory, if comparison results in non-matching.

13. The memory access method according to claim 12, wherein data read from the memory is outputted after being subjected to a redundancy decoding process.

14. The memory access method according to claim 13, wherein both of a value resulting from the redundancy decoding process performed for the data resulting from the redundancy coding process for the write data, and a value resulting from the redundancy decoding process performed for the data obtained by inverting individual bits of the data resulting from the redundancy coding process for the write data, are equal to the write data.

15. The memory access method according to claim 14, wherein, when the write data has "n" bits ("n" is an integer of "1" or more), data resulting from a redundancy coding process and data read from the memory have "n+1" bits, and data resulting from the redundancy decoding process have "n" bits.

16. The memory access method according to claim 15, wherein:

the redundancy coding process comprises:

outputting a value "0" as a first bit of output;

outputting a value equal to a first bit of the write data as a second bit of output; and calculating an XOR of a "$k^{th}$" bit ("k" is an integer satisfying "$2 \leq k \leq n$") value of output and a "$k^{th}$" bit value of the write data to output calculation results as a "$k+1^{th}$" bit of output.

17. The memory access method according to claim 15, wherein:

the redundancy coding process comprises:

outputting a value "1" as a first bit of output;

outputting a value that is a negation of a first bit of the write data, as a second bit of output; and calculating an XOR of a "$k^{th}$" bit ("k" is an integer satisfying "$2 \leq k \leq n$") value of output and a "$k^{th}$" bit value of the write data to output calculation results as a "$k+1^{th}$" bit of output.

18. The memory access method according to claim 15, wherein:

the redundancy coding process comprises:

outputting a value "0" as an "$m+1^{th}$" bit ("m" is an integer satisfying "$2m=n$") of output;

outputting a value equal to an "$m^{th}$" bit of the write data as an "$m^{th}$" bit of output;

calculating an XOR of a "$j^{th}$" bit ("j" is an integer satisfying "$2 \leq j \leq m$") of output and a "$j-1^{th}$" bit of the write data to output calculation results as a "$j-1^{th}$" bit of output;

outputting a value equal to an "$m+1^{th}$" bit of the write data as an "$m+2^{th}$" bit of output; and calculating an XOR of a "$k^{th}$" bit ("k" is an integer satisfying "$m+2 \leq k \leq 2m$") and a "$k^{th}$" bit of the write data to output calculation results as a "$k+1^{th}$" bit of output.

19. The memory access method according to claim 15, wherein:

the redundancy coding process comprises:

outputting a value "1" as an "$m+1^{th}$" bit ("m" is an integer satisfying "$2m=n$") of output;

outputting a value which is a negation of an "$m^{th}$" bit of the write data as an "$m^{th}$" bit of output;

calculating an XOR of a "$j^{th}$" bit ("j" is an integer satisfying "$2 \leq j \leq m$") of output and a "$j-1^{th}$" bit of the write data to output calculation results as a "$j-1^{th}$" bit of output;

outputting a value which is a negation of an "$m+1^{th}$" bit of the write data as an "$m+2^{th}$" bit of output; and calculating an XOR of a "$k^{th}$" bit ("k" is an integer satisfying "$m+2 \leq k \leq 2m$") of output and a "$k^{th}$" bit of the write data to output calculation results as a "$k+1^{th}$" bit of output.

20. The memory access method according to claim 15, wherein the redundancy decoding process comprises calculating an XOR of a "$k^{th}$" bit ("k" is an integer satisfying "$1 \leq k \leq n$") value and a "$k+1^{th}$" bit value among "n+1"-bit data read from the memory to output calculation results as a "$k^{th}$" bit of output.

* * * * *